(12) United States Patent
Ufford et al.

(10) Patent No.: US 8,316,086 B2
(45) Date of Patent: Nov. 20, 2012

(54) SYSTEM, METHOD, AND COMPUTER PROGRAM PRODUCT FOR VERIFYING THE IDENTITY OF SOCIAL NETWORK USERS

(75) Inventors: Stephen Ufford, Vancouver (CA); Tanis Jorge, Surrey (CA)

(73) Assignee: Trulioo Information Services, Inc., Vancouver (CA)

( * ) Notice: Subject to any disclaimer, the term of this patent is extended or adjusted under 35 U.S.C. 154(b) by 260 days.

(21) Appl. No.: 12/731,854

(22) Filed: Mar. 25, 2010

(65) Prior Publication Data

US 2010/0250676 A1 Sep. 30, 2010

Related U.S. Application Data

(60) Provisional application No. 61/164,114, filed on Mar. 27, 2009.

(51) Int. Cl.
*G06F 15/16* (2006.01)
*G06Q 99/00* (2006.01)

(52) U.S. Cl. .......................... 709/204; 709/203; 705/319

(58) Field of Classification Search .................. 709/203, 709/204; 705/319
See application file for complete search history.

(56) References Cited

U.S. PATENT DOCUMENTS

| | | | |
|---|---|---|---|
| 7,756,756 B1 * | 7/2010 | Lifson | 705/26.1 |
| 2005/0005168 A1 | 1/2005 | Dick | |
| 2006/0042483 A1 * | 3/2006 | Work et al. | 101/91 |
| 2006/0277092 A1 | 12/2006 | Williams | |
| 2009/0172081 A1 * | 7/2009 | Bryant et al. | 709/203 |
| 2009/0187569 A1 * | 7/2009 | Lubarski et al. | 707/6 |

* cited by examiner

*Primary Examiner* — Jeong S Park
(74) *Attorney, Agent, or Firm* — Mark R. Malek, Esq.; William A. Harding, Esq.; Zies Widerman & Malek

(57) ABSTRACT

An advanced identity verification system, method, and computer program product are provided that enable a user to create and individualize a repository of identifying data, and then incorporate that repository into processes that require reliable identification of an individual. Real-world acquaintances of the user can be queried to determine the accuracy of identifying data in the repository. As more and more acquaintances respond concerning a particular item of identifying data, a numeric accuracy index may be provided that permits an inquiring party to determine whether the identifying data may be trusted.

24 Claims, 7 Drawing Sheets

SYSTEM, METHOD, AND COMPUTER PROGRAM PRODUCT FOR VERIFYING THE IDENTITY OF SOCIAL NETWORK USERS

RELATED APPLICATIONS

This application claims the benefit of U.S. Provisional Application Ser. No. 61/164,114 filed on Mar. 27, 2009, the contents of which are incorporated herein in their entirety.

FIELD OF THE INVENTION

The present invention relates to the field of identity verification and, more specifically, to the field of identity verification for social network users.

BACKGROUND OF THE INVENTION

The use of social networking sites and other peer-to-peer sites is drastically increasing. One key aspect of these sites is the exchange of data between users. In order to effectively exchange data, it is desirable for originating users to be able to verify the identity of a receiving user before allowing access to data controlled by the originating user. Stated another way, current embodiments of online social networks are susceptible to manipulation by users who would actively deceive other users to obtain private information, or worse, to lure naïve users into potentially dangerous situations.

Online communities, such as dating websites, forums, chat rooms, news groups, and adult websites, often present an opportunity for identity fraud, wherein a malicious user may misrepresent personal information to fellow users, including their age, marital status, employment status, and location, all for the purpose of portraying a carefully constructed facade to unsuspecting marks. Once the innocent user's trust has been gained, a savvy rogue may be able to extract valuable information concerning the user's finances, for example. Crafty philanderers may indicate in their online dating profile that they are unmarried, in order to pursue extramarital affairs. Teens may lie about their age, in order to gain access to content that is meant for more mature audiences.

Similarly, there is a desire to ensure the privacy of personal information. With respect to social networking sites in particular, such information is generally exchanged between users freely. Often times, information is published on such sites without any regard for whether the information is readily available to be seen by unwanted viewers. In an effort to control the number of users that may view information posted on social networking sites, systems have been developed for users to restrict access to their information. For example, a user may "accept or reject" a request from another user to view information. One issue that has arisen, however, is the ability of the posting user to verify the identity of a requesting user. In other words, it may be possible for a requesting user to be an imposter, who is impersonating another user, or who has set up a false account, in order to gain access to the responding user's account.

Some systems have been introduced in an attempt to compensate for such deficiencies. For example, U.S. Published Patent Application No. 2006/0277092 by Williams discloses a system and method for a peer-to-peer exchange of consumer information. The system includes a security component to authenticate a peer. The security component receives the peer's identity and verifies the identity. A service company may provide a public key infrastructure to verify the identity of a peer. Once authenticated with another peer, a peer may transmit and receive queries during a communications session, such as queries seeking certain consumer information.

Another type of system is disclosed in U.S. Published Patent Application No. 2005/0005168 by Dick, which discloses a method for creating a database of verified personal information. The method includes gathering information regarding individuals from one or more sources and storing that information. Authorized individuals may request to view the information over a wide area computer network. The authorized individuals may be allowed to review selected portions of the gathered information that is presented over the wide area computer network. Commentary from the authorized users on the accuracy of the information may be solicited and included in the database with information. Third parties do not have access to the database of verified personal information, but can verify information outside of the database.

Other existing solutions to identity verification issues include faxing, emailing or mailing copies of identity documents to processing centers, accessing personal credit information, or accessing public record information. These existing solutions come at a cost to users, both financially and in terms of privacy. Such solutions are also subject to fraud and to not, in many cases, ensure the actual user is the subject of the identity data being used in the transaction. The prior known identity solutions, used for the purpose of identity verification, allow peers to review and verify identity data anonymously, or function by using website accounts specifically created for the purposes of reviewing and commenting on the identity data submitted by other users. Those skilled in the art will appreciate that the known identity solutions are largely ineffective when used in an online environment.

One issue that still remains, however, is that information used for verification is gathered from public and private third-party databases, publications, public records and files on the Internet. Further, the above referenced systems do not leverage architecture that is already in place, from existing social networking websites, to access the subject individual's real-world social network, which would have knowledge of the subject. Accordingly, not only are the above-referenced systems expensive and cumbersome to carry out, but those systems are likely to have a certain level of associated unreliability.

The systems mentioned above do not allow users to control both the nature and depth of the information available in the database, because the user did not originally author the information. Again, since the information is gathered from public and private third-party databases, the user cannot truly be assured that the information they are receiving is trustworthy.

SUMMARY OF THE INVENTION

In general, embodiments of the present invention provide an improvement by, among other things, providing an identity verification system that enables a social network member or another authorized party to create, individualize and manage a repository of identifying facts about themselves. The identity verification system may then be accessed by acquaintances of the social network member, who can confirm or deny the accuracy of various identifying facts pertaining to the social network member. As acquaintances perform the tasks of confirming or denying identifying facts, a numeric accuracy index for each fact is automatically adjusted by the identity verification system, providing a measurement of the veracity of those facts, based on responses provided by real-world individuals who are familiar with the social network member. The resulting repository of identifying information can then be utilized by any number of processes that require reliable identification of an individual.

According to one aspect, a system for verifying the identity of a social network member is provided. In one embodiment, the system may include a user device and a network entity in electronic communication with the user device. The network entity may include a processor and a memory storing a profile module, data module, verification module, and publication module, all executable by the processor. According to one embodiment, the profile module may be configured, upon execution, to receive a plurality of identifying data as multiple items of identifying data, wherein the identifying data comprises one or more facts that describe characteristics of the social network member, and those facts, in combination, uniquely identify the social network member. The profile module may be further configured to receive contact information for a plurality of persons who are acquainted with the social network member, the plurality of persons who are acquainted with the social network member being defined as acquaintances, and the contact information for acquaintances being defined as acquaintance data.

According to this embodiment, the data module may be configured, upon execution, to store and retrieve the plurality of identifying data and the acquaintance data. In order to enable the identifying data to be used in verifying the identity of the social network member, the verification module may be configured, upon execution, to assign a numeric accuracy index to each of the plurality of identifying data. The publication module, also according to this embodiment, may be configured, upon execution, to selectively publish at least one of the items of identifying data and the respective numeric accuracy index associated with the at least one item of identifying data, wherein the publication module publishes the at least one item of identifying data in response to receipt of a request from an authorized user.

In one embodiment, the verification module may include a request module, which may be configured, upon execution, to send at least one verification request for at least one respective item of identifying data to at least one of the acquaintances, the at least one acquaintances receiving a verification request being defined as at least one verifying acquaintance. The verification module, according to this embodiment, may also include a reception module, which may be configured, upon execution, to receive at least one of a positive indication, a negative indication, and a without knowledge indication from the at least one verifying acquaintance, the positive indication indicating that the item of identifying data in the verification request is accurate, the negative indication indicating that the item of identifying data in the verification request is inaccurate, and the without knowledge indication indicating that the at least one verifying acquaintance is without knowledge of the item of identifying data in the verification request.

According to another aspect a computer-implemented method is provided for verifying the identity of a social network member. In one embodiment, the method may include receiving a plurality of identifying data as multiple items of identifying data, wherein the identifying data comprises one or more facts that describe characteristics of the social network member, and those facts, in combination, uniquely identify the social network member. According to this embodiment, verifying the identity of a social network member may further include: (1) assigning a numeric accuracy index with each of the plurality of identifying data; (2) receiving contact information for a plurality of persons who are acquainted with the social network member, the plurality of persons who are acquainted with the social network member being defined as acquaintances; (3) sending at least one verification request for at least one respective item of identifying data to at least one of the acquaintances, the at least one acquaintances receiving a verification request being defined as at least one verifying acquaintance; (4) receiving at least one of a positive indication, a negative indication, and a without knowledge indication from the at least one verifying acquaintance, the positive indication indicating that the item of identifying data in the verification request is accurate, the negative indication indicating that the item of identifying data in the verification request is inaccurate, and the without knowledge indication indicating that the at least one verifying acquaintance is without knowledge of the item of identifying data in the verification request; and (5) selectively publishing, in response to receipt of a request from an authorized user, at least one of the items of identifying data, the at least one item of identifying data that is published being defined as at least one item of published data and the respective numeric accuracy index associated with the at least one item of published data.

According to yet another aspect, a computer program product for verifying the identity of a social network member is provided, wherein the computer program product comprises at least one computer-readable storage medium having one or more computer-readable program code portions stored therein. In one embodiment, the computer-readable program code portions may comprise a first executable portion for receiving a plurality of identifying data as multiple items of identifying data. The computer program product of this embodiment may further comprise: (1) a second executable portion for assigning a numeric accuracy index with each of the plurality of identifying data; (2) a third executable portion for receiving contact information for a plurality of persons who are acquainted with the social network member, the plurality of persons who are acquainted with the social network member being defined as acquaintances; (3) a fourth executable portion for sending at least one verification request for at least one respective item of identifying data to at least one of the acquaintances, the at least one acquaintances receiving a verification request being defined as at least one verifying acquaintance; (4) a fifth executable portion for receiving at least one of a positive indication, a negative indication, and a without knowledge indication from the at least one verifying acquaintance, the positive indication indicating that the item of identifying data in the verification request is accurate, the negative indication indicating that the item of identifying data in the verification request is inaccurate, and the without knowledge indication indicating that the at least one verifying acquaintance is without knowledge of the item of identifying data in the verification request; and (5) a sixth executable portion for selectively publishing, in response to receipt of a request from an authorized user, at least one of the items of identifying data, the at least one item of identifying data that is published being defined as at least one item of published data and the respective numeric accuracy index associated with the at least one item of published data.

BRIEF DESCRIPTION OF THE DRAWINGS

Figure 1:
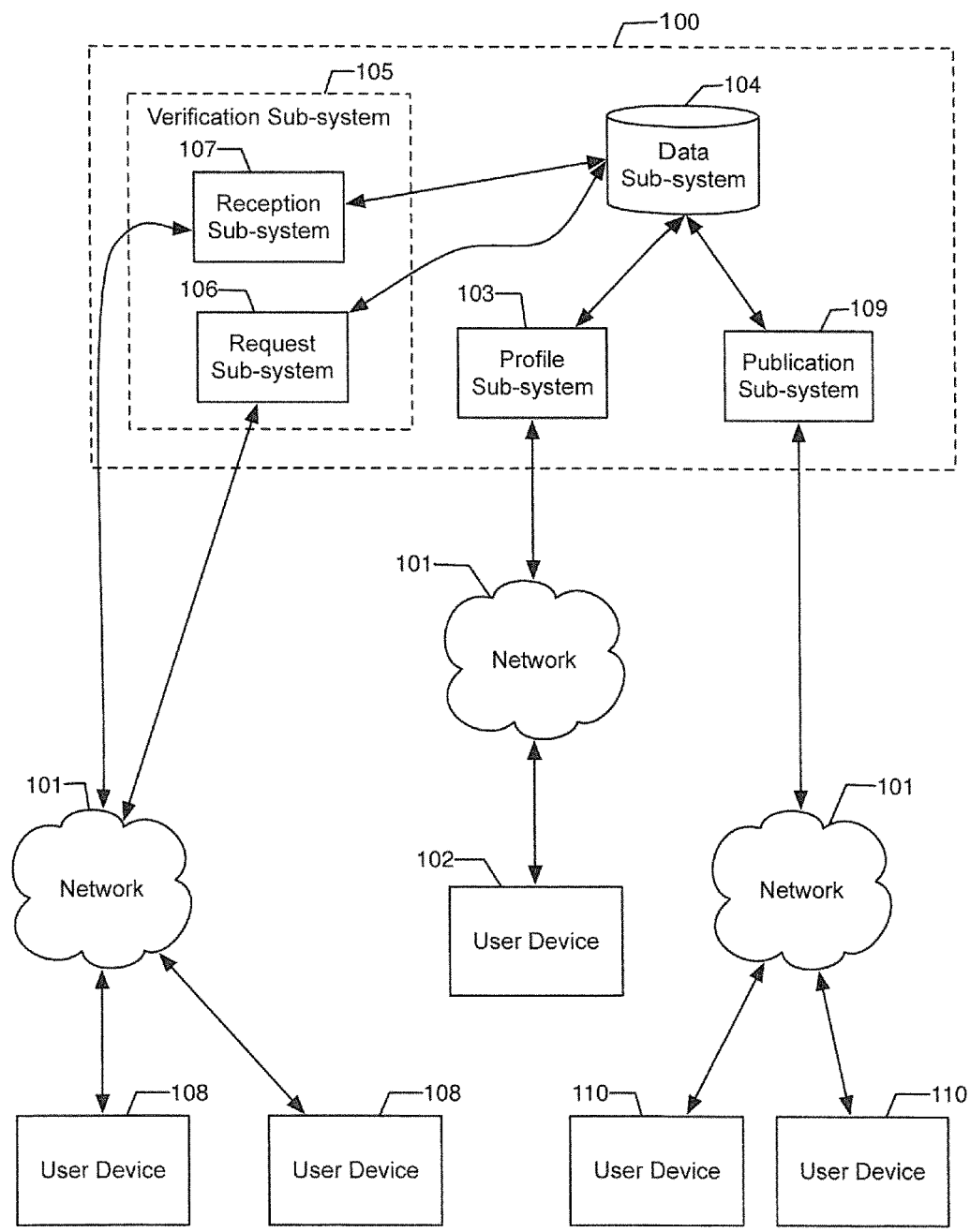
Figure 2:
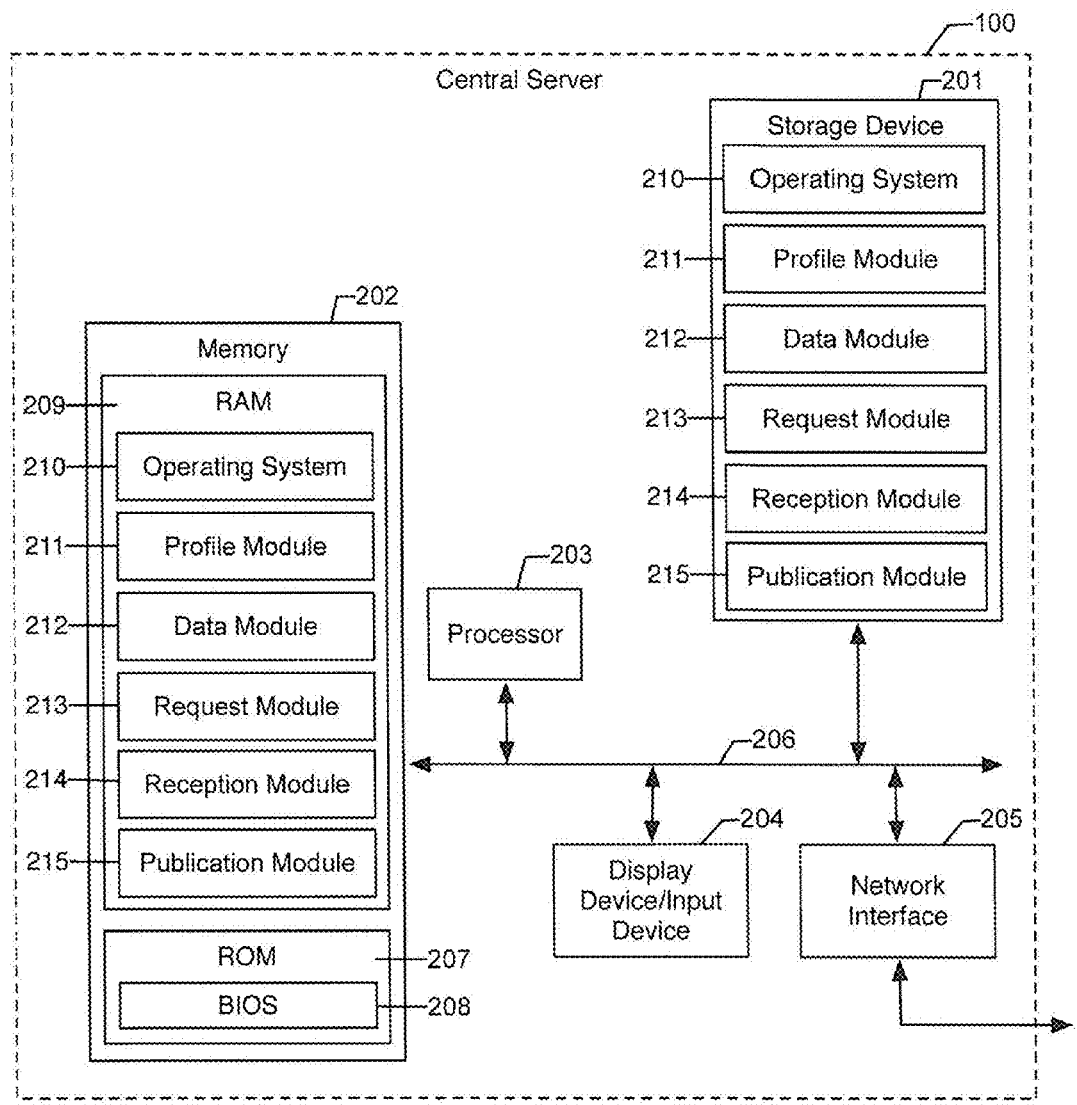
Figure 3:
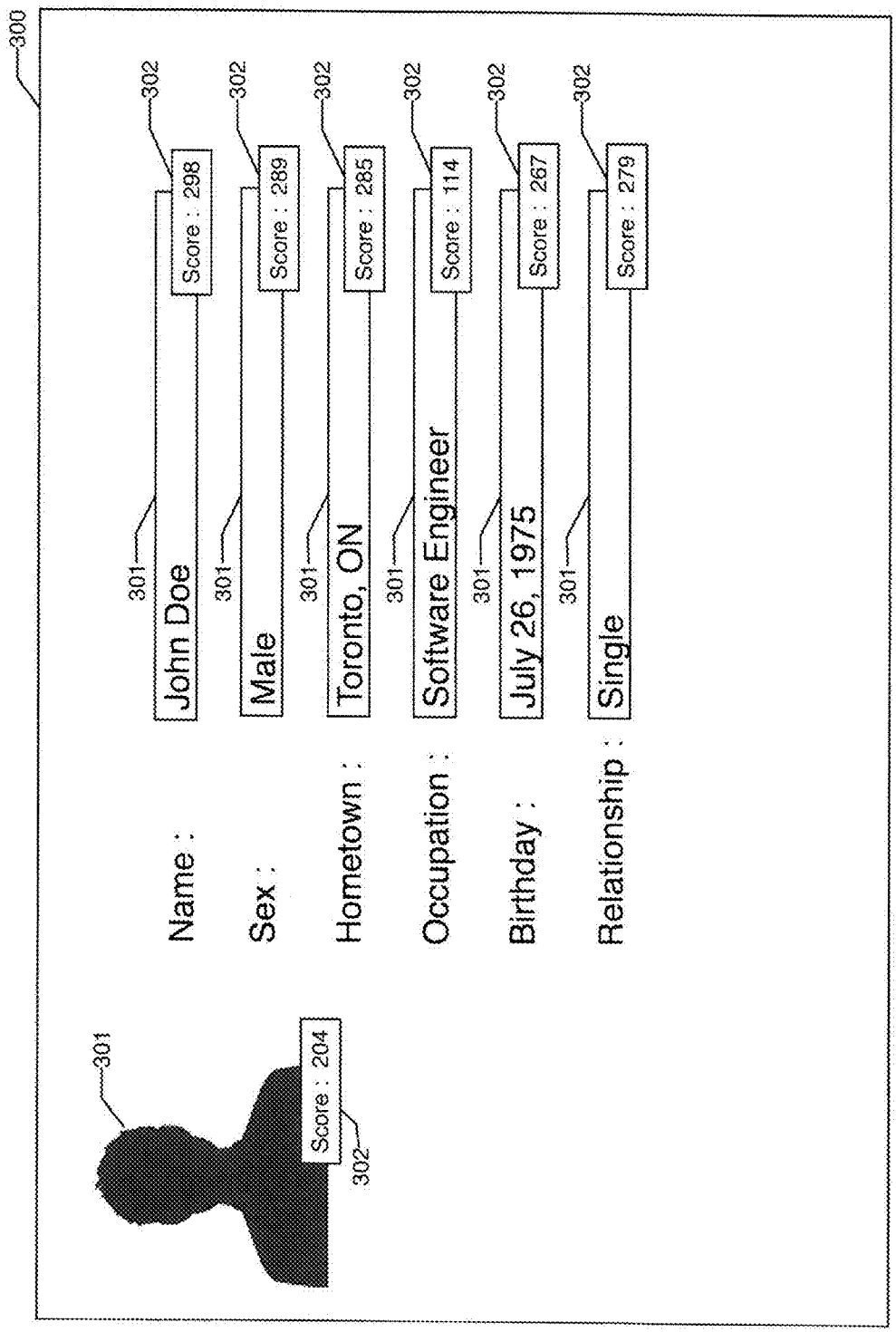
Figure 4:
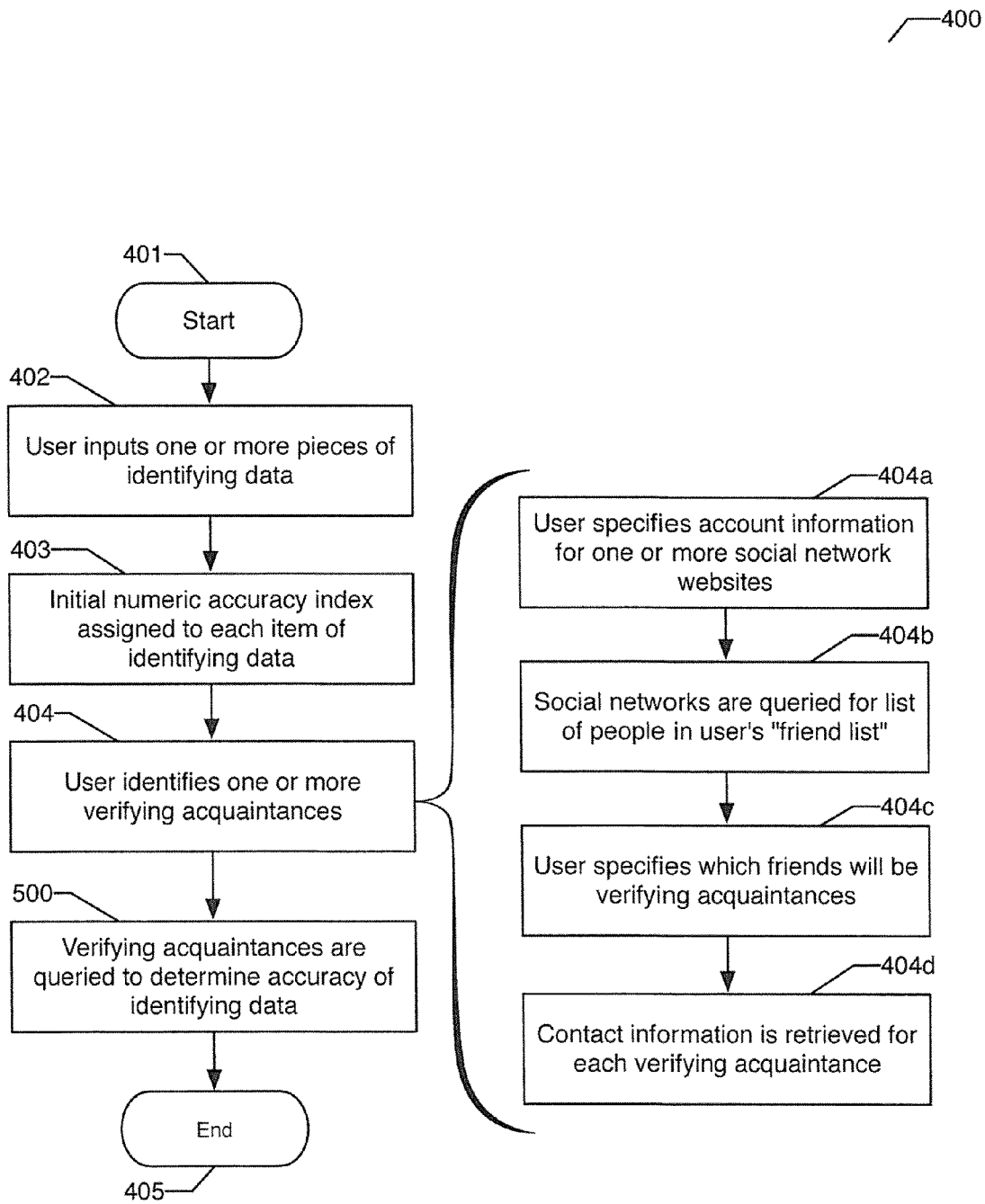
Figure 5:
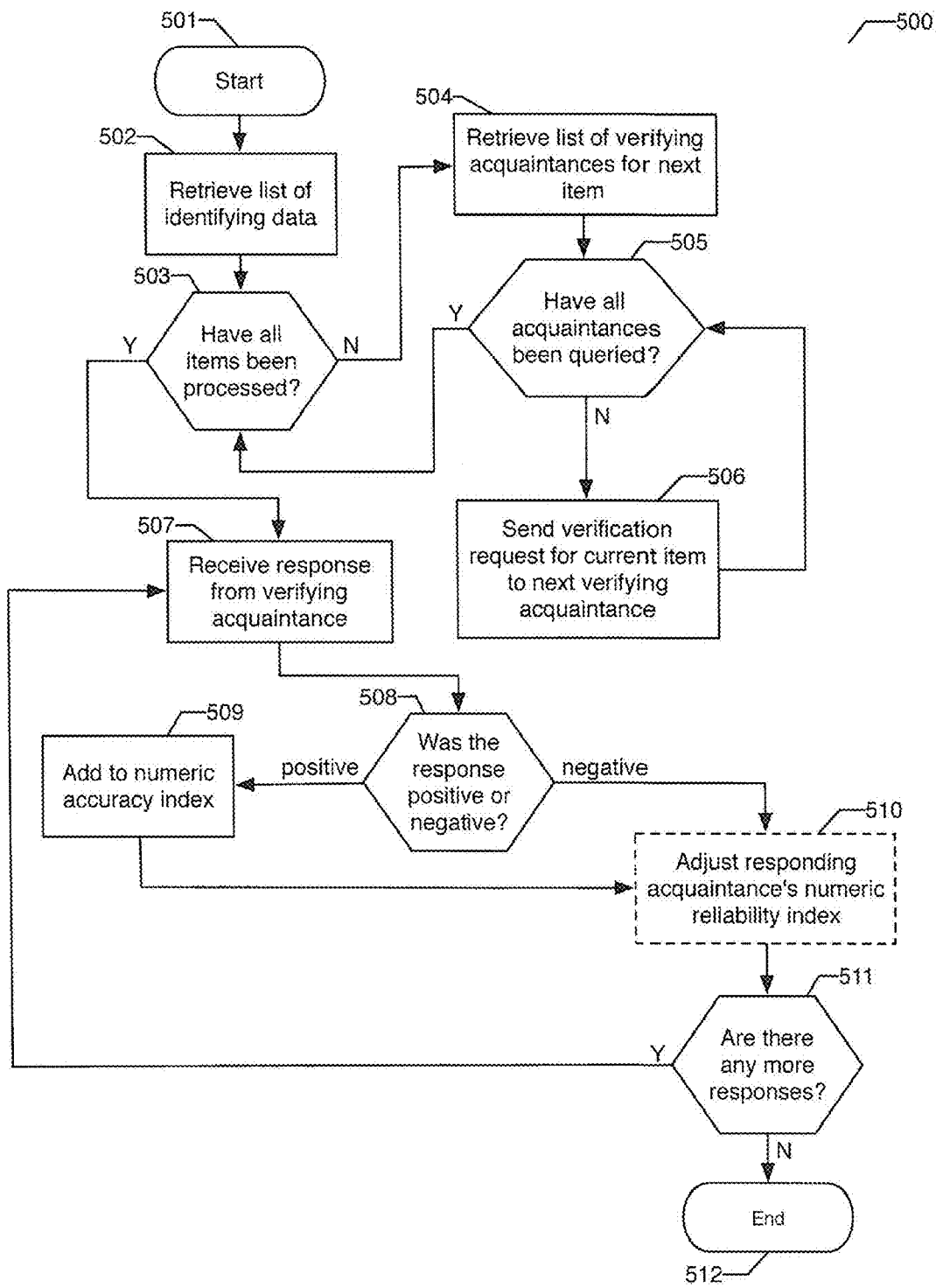
Figure 6:
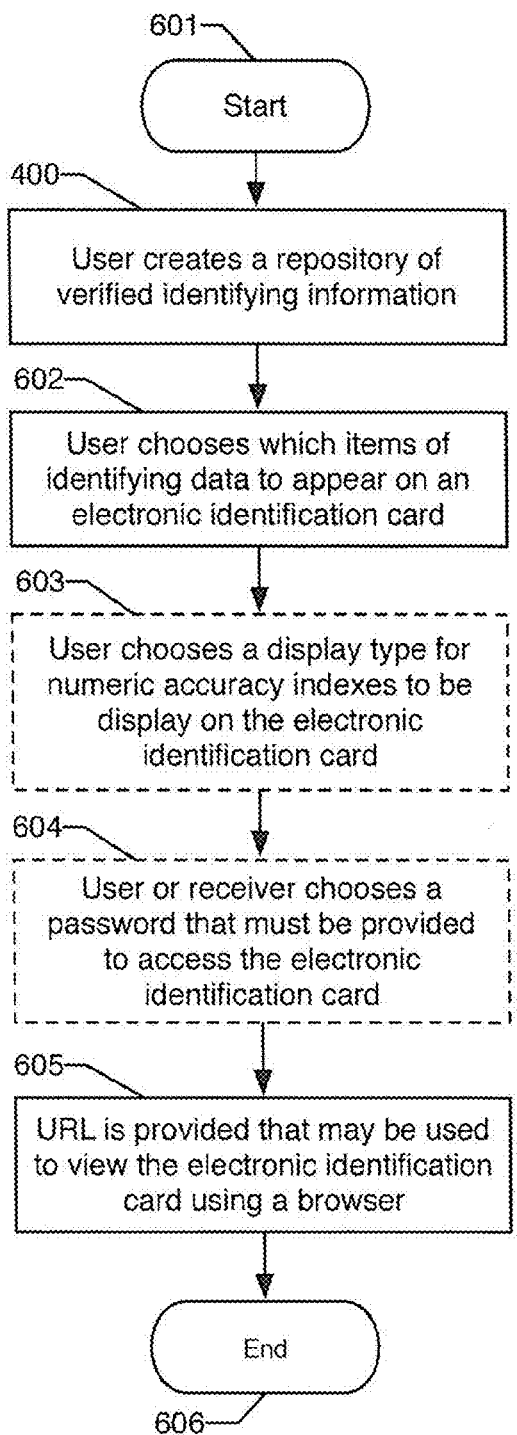
Figure 7:
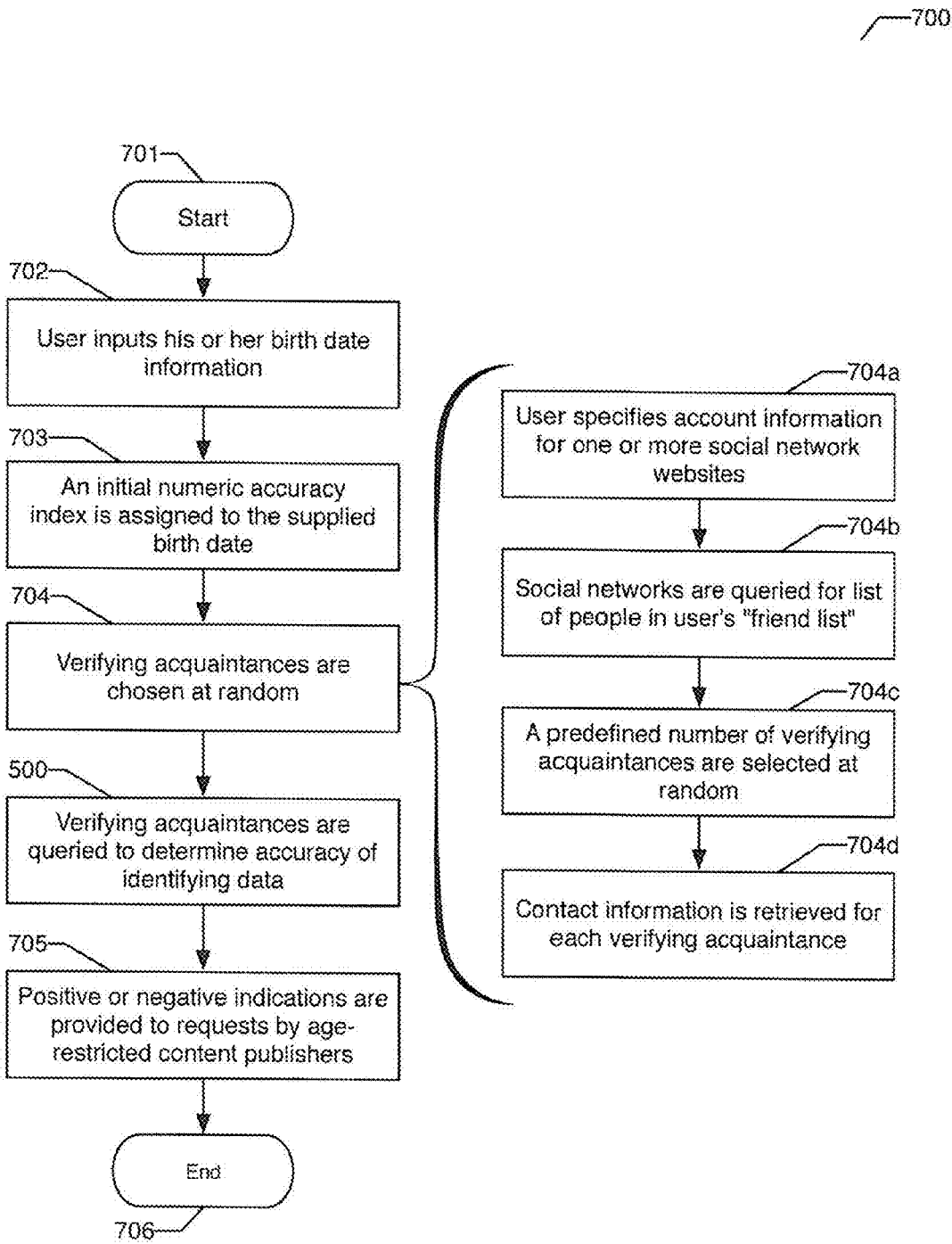

Having thus described embodiments of the invention in general terms, reference will now be made to the accompanying drawings, which are not necessarily drawn to scale, and wherein:

FIG. 1 is a block diagram of one type of system that may benefit from embodiments of the present invention;

FIG. 2 is a schematic block diagram of a Central Server according to one embodiment of the present invention;

FIG. 3 is a schematic representation of electronic identification card in accordance with embodiments of the present invention;

FIG. 4 is a flow chart illustrating the process of creating, individualizing and managing a repository of identifying information in accordance with embodiments of the present invention;

FIG. 5 is a flow chart illustrating the process of sending verification requests to and receiving responses from verifying acquaintances in accordance with embodiments of the present invention;

FIG. 6 is a flow chart illustrating the process of verifying a social network member's identity to an interested third party in accordance with embodiments of the present invention; and FIG. 7 is a flow chart illustrating the process of verifying a social network member's age to an adult-only website in accordance with embodiments of the present invention.

DETAILED DESCRIPTION OF THE PREFERRED EMBODIMENTS

Embodiments of the present invention now will be described more fully hereinafter with reference to the accompanying drawings, in which some, but not all embodiments of the invention are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

Embodiments of the present invention are described herein using the context of a system of computers, servers, and software. Those of ordinary skill in the art will realize that the following embodiments of the present invention are only illustrative and are not intended to be limiting in any way. Other embodiments of the present invention will readily suggest themselves to such skilled persons having the benefit of this disclosure.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with embodiments of the present invention, the components, process steps, and/or data structures may be implemented using various types of operating systems, computing platforms, computer programs, and/or general purpose machines. In addition those of ordinary skill in the art will recognize, after having the benefit of this disclosure, that devices of a less general purpose nature, such as hardwired devices, field programmable gate arrays (FPGAs), application specific integrated circuits (ASICs), or the like, may also be used without departing from the scope and spirit of the inventive concepts disclosed herein.

The computer program, according to an embodiment of the present invention, is a computerized system that requires the performance of one or more steps on or in association with a computerized device, such as, but not limited to, a server, a computer (i.e., desktop computer, laptop computer, netbook, or any machine having a processor), a dumb terminal that provides an interface with a computer or server, a personal digital assistant, mobile communications device, such as an iPhone, Blackberry, or other similar device that provides computer or quasi-computer functionality, a mobile reader, such as a Kindle, which provides reader functionality that may be enabled, through either internal components or connecting to an external computer, server, or global communications network (such as the Internet), to take direction from or engage in processes which are then delivered to the mobile reader. It should be readily apparent to those of skill in the art, after reviewing the materials disclosed herein, that other types of devices, individually or in conjunction with an overarching architecture, associated with an internal or external system, may be utilized to provide the "computerized" environment necessary for the at least one process step to be carried out in a machine/system/digital environment. It should be noted that the method aspects of the present invention are preferably computer-implemented methods and, more particularly, at least one step is preferably carried out using a computerized device.

With the above in mind, it is therefore an object of the present invention to provide a system that readily verifies a user's identity in a trustworthy and reliable manner. It is also an object of the present invention to leverage the architecture and infrastructure of existing social networking websites to access a user's real world social network (i.e., "acquaintances" from work, school, family, community organizations, etc.), the members of which would have knowledge of the identity of the user. It is further an object of the present invention to provide social network members with control over the nature and depth of information available in a repository of identifying data. These and other object, features and advantages of the present invention will be described in greater detail below.

Accordingly, it is desirable to have a collaborative architecture with associated software that establishes a more reliable method of collecting and verifying an individual's identity information for use in peer-to-peer transactions and communications. The present invention advantageously provides improved systems, methods, and computer program products for identity verification that are more reliable than existing methods, which rely on access to third-party databases. More specifically, the present invention advantageously leverages offline social networks for use in an online environment.

Access to a user's offline social network provides for a high level of data integrity and is unique because it associates each social network member with their own information, as the individual social network members are entirely responsible for compiling the repository. Current methods rely on data from public and private databases that are generally compiled by third parties, and are not verified by the subject individual, or by persons with direct knowledge of the subject individual. This new system, method, and computer program product for identity verification advantageously provide a higher level of confidence and security in peer-to-peer transactions, as well as providing increased control over personal information for individual social network members.

Overview:

The present invention relates to both a system and associated software. With respect to the system, it is best characterized as a tool to gather, verify, and share personal identity information over the Internet, or other global communications network, as understood by those having skill in the art.

The core components that together make up the architecture of the system include application servers, database servers, and firewalls. Generally speaking, the above-referenced components are preferably structured such that personal information can be passed between peers and third-party websites on web servers. It is also preferable that the above-referenced components are structured so that personal information can be passed through firewalls, to be stored in data repositories. This architecture allows the system of the present invention to collect and compile identity data from social network members. The architecture also allows the system of the present invention to poll acquaintances on social networks for verification and to write data to a repository in a secure environment, thereby allowing access to verified identity data by authorized parties only.

In order to accomplish the desired objectives of the present invention, the system uses certain associated software that provides users with the ability to poll, in real time, all or certain "friends" or "peers" associated with that user's social networking website profile, as determined by the social network member. The poll may contain a request that all acquaintances receiving the poll verify certain aspects of the social network member's identity, such as their name, age (birth date), location, occupation, photograph of the social network member, etc.

An acquaintance receiving the verification request from the social network member preferably has the opportunity to confirm or deny that the information in the request is correct, to the best of the verifying acquaintance's knowledge. Each time an acquaintance responds to a verification request, the application preferably records those responses in a data repository, such as a database. The data repository in which the responses are stored may be on one of a plurality of database servers. After storing the responses in a data repository, the social network member's profile may be updated on a corresponding social network website with the poll results.

The poll results recorded in the data repository may be made available to an inquiring user via an internet-based website. The website may provide the social network member with the ability to provide access to all or certain aspects of the poll results with peers, associations, or businesses in or outside of their social networks. Access may also be provided on an individual or group basis. Poll results may be continually updated in the data repository as individual acquaintances from the subject user's established social networks respond to verification requests generated by the subject user. In the event that the social network member belongs to more than one social network, the poll results may advantageously be aggregated in the data repository by the application.

Embodiments of the present invention advantageously provide a system, together with an associated computer process, to verify personal identity information. The verification system may include a web server that is preferably connected to a network and that preferably hosts an application that interacts with users over the Internet. The network preferably processes user identity and acquaintance contact data before passing it through a firewall to the data base server. Thereafter, a database server that is connected to the network may store all user identity and acquaintance contact data gathered and processed by the application.

As will be discussed in greater detail below, the associated computer process preferably includes the following executable steps:

1. A social network member registers with the application hosted on the web server.
2. The social network member generates and submits identity data via the application and web server, using a profile module. The data is preferably stored in a data repository, through execution of a data module.
3. Acquaintances receive and verify identity data via execution of a verification module. Again, the data is preferably stored in the data repository, through execution of a data module.
4. Inquiring users may then access identity and acquaintance verification data stored in the data repository via execution of a publication module.
5. The social network member may optionally authorize third-party access to his or her own personal identity and acquaintance verification data stored in the data repository via execution of a security module.

Those skilled in the art will appreciate that although the above steps are preferred in carrying out the associated computer process, the benefits, advantages and features of the present invention may still be carried out if less than all of the steps mentioned above are carried out.

The systems, methods, and computer program products utilizing social networks to verify personal identity information may also encompass several other features. For example, systems, methods, and computer program products embodying the present invention may include an identity-scoring component, which can be used to evaluate the archived contents of an individual social network member's identity data in the data repository. The identity-scoring component may also be used to calculate a numeric score based on the results of the evaluation.

A business access module may provide another component of systems, methods, and computer program products embodying the present invention. The business access module may allow certain parties ("subscriber businesses") to access the contents of an individual social network member's identity data in the data repository for the purposes of conducting a transaction with the social network member where identity verification may be required. The social network member may have the ability to grant, deny and manage access for subscriber businesses requesting access to their identity information stored in the data repository via execution of a security module.

Systems, methods, and computer program products embodying the present invention may include the ability to fetch certain data from the individual social network member's profile from various online communities where the social network member has installed the application. The data may be archive to the data repository. Systems, methods, and computer program products embodying the present invention may also advantageously provide a social network member with the ability to embed into any electronic communication or website a custom icon ("trustmark"), including a hypertext permalink to his or her identity verification data. This feature of systems, methods, and computer program products embodying the present invention advantageously allow a social network member to display a recognizable trustmark anywhere on the Internet where confidence in identity is required. Those skilled in the art will appreciate that the application may be entirely or partially hosted on third-party servers.

An application embodying to the systems and methods of the present invention for identity verification is preferably provided by a customized computer program product that may be made available to users of various social networking websites, such as Facebook® and MySpace®, for example, but not intended as a limitation. The social network member, once registered with the application, may have the ability to poll all or certain "friends" or "peers" associated with that social network member's online community profile (i.e., acquaintances) as determined by the social network member. The poll may contain a request that all acquaintances receiving the poll verify certain aspects of the user's identity. These aspects may, for example, include the social network member's name, age (birth date), location, occupation, photograph of the social network member, etc.

An acquaintance receiving the verification request from the social network member may have the opportunity to confirm, deny or reply as unknown that the information in the request is correct to the best of their knowledge. Each time an acquaintance responds to a verification request, the application may record results in a data repository. The results recorded in the data repository may be made available to the social network member via execution of systems, methods, and computer program products, according to at least one embodiment of the present invention.

A computer program product embodying the systems and methods of the present invention may also advantageously provide the social network member with the ability to allow access to all or certain aspects of the verified identity data with peers, inquiring users, associations, or businesses. These referred to collectively as "receivers". The receivers may, for example, be a part of, or outside of, the social network member's social networks. Further, the receivers may receive the information on an individual or group basis by provision of either a secure socket layer (SSL) hyperlink, distributed by email, or through a public website address.

Additionally, a password may be required to access identity information. Such a password may be distributed in any manner the parties choose, i.e., email, chat messenger, telephone, etc. Further, the password may be chosen by the receiver or user, and saved in the data repository.

Responses to verification requests may be continually updated in the data repository as individual acquaintances from the social network member's established social networks respond to requests generated by the social network member. In the event that the social network member utilizes a computer program product embodying the systems and methods of the present invention on more than one social network, the responses to verification requests may advantageously be aggregated in the data repository. The social network member may also share the information contained in the data repository with third parties via a system-to-system connection, i.e., XML web services, RSS Feeds, etc. In the event that the social network member opts to share all or certain aspects of his or her own identity information with third parties in the above-referenced manner, it is preferable that the social network member grants authorization to these third parties via execution of an included security module, according to an embodiment of the present invention, prior to sharing the aspects of his or her identity. Authorized business may then receive ongoing access to the social network member's identity information that is contained in the data repository, unless terminated by the social network member via the application.

As detailed above, the systems, methods, and computer program products embodying the present invention advantageously provide a novel way for users to verify the identity of a peer they are communicating with over a global communications network. Strong identity verification has many applications in both peer-to-peer transactions (including Internet dating, EBay® and Craigslist® sales) as well as business-to-consumer transactions (including adult-only websites and gambling websites, which require age verification of users). Systems, methods, and computer program products embodying the present invention provide a high level of fraud deterrence by leveraging the unique nature of online social networks. Systems, methods, and computer program products embodying the present invention allow for verification of user-submitted identity, wherein peers having established social networking profiles of their own preferably perform the verification. Such networking profiles are generally difficult to fraudulently create due to the depth and complexity of the peer structure. This provides for a much higher level of fraud deterrence and trust level in the accuracy of the identity data in a data repository created in accordance with embodiments of the present invention.

Systems, methods, and computer program products embodying the present invention are superior and more reliable than other systems because they leverage real-world social networks to verify identity information for use in an online environment. Governments around the world rely on the social network of its citizens to verify identity information before issuing hard copy citizenship credentials, such as passports. State professional agencies similarly rely on contacting identified references in evaluating the character and fitness of new applicants. The identity verification processes and systems embodying the present invention can be conducted using any global communication network, such as the Internet, for example, without relying on other technologies such as fax and post mail. Accordingly, systems, methods, and computer program products embodying the present invention are faster, cheaper and more appealing for Internet users. Systems, methods, and computer program products embodying the present invention are unique because they give users the ability to control access to their own personal identity information in real time. Systems, methods, and computer program products embodying the present invention also provide receivers of the identity information a higher level of trust because of embedded unique password security features.

Systems, methods, and computer program products embodying the present invention also advantageously allow a receiver of identity data to gauge the trustworthiness of the information. More particularly, a receiver may gauge the trustworthiness of the information being presented by examining the social network member's numeric accuracy indexes, based on the responses of acquaintances to verification requests. Higher accuracy indexes for a specific piece of identity information may indicate more reliable the information. In other words, a surname verified by 50 acquaintances is more reliable then a surname verified by 10 acquaintances, as a non-limiting example. This aspect of systems, methods, and computer program products embodying the present invention advantageously provide each receiver with the ability to dynamically assess and utilize identity information, depending on the type of transaction.

In general, embodiments of the present invention provide a system, method and computer program product for creating and individualizing a repository of identifying information that, when combined, uniquely identify a particular individual, and integrating access to that repository into any workflow requiring the identity of that individual to be reliably established. In particular, according to embodiments of the present invention, when a social network member has registered with the application, identifying information may be provided, which uniquely identify the social network member, for example, but not intended as a limitation, name, age (or birth date), occupation, hometown, marital status, a photograph depicting the social network member, etc.

According to one embodiment, the social network member may provide contact information for one or more people from his or her social network, who are acquainted with the social network member. Both the identifying data and the contact information for acquaintances may be stored in a data repository. In one embodiment, the social network member may provide contact information for acquaintances by specifying one or more online communities, such as Facebook®, MySpace®, or LinkedIn®, to which the social network member belongs, where his or her "friends" may be retrieved using application programming interface (API) interaction.

Upon receiving contact information for one or more acquaintances, those acquaintances can be contacted to establish the veracity of the identifying data provided by the social network member. In particular, according to one embodiment, verification requests may be sent to one or more of the acquaintances, asking them to confirm the accuracy of one or more pieces of the identifying data. When each verifying acquaintance receives a verification request, he or she may thereafter respond by confirming the accuracy of a fact, denying that a fact is accurate, or asserting that a particular fact is unknown.

Once responses to verification requests have been received, a numeric index associated with each piece of identifying data may be adjusted to reflect the accuracy of that particular datum. Numeric accuracy indexes may be given an initial default value that reflects that the associated datum has not been verified and thereafter incremented for each response from a verifying acquaintance indicating that the respecting identifying datum is accurate. In one embodiment, the identifying data provided by the social network member may be compared with the values associated with a profile created on an established online community, such as Facebook®, MySpace®, or LinkedIn®, and an initial accuracy index may be generated based on one or more such comparisons.

Once the accuracy of a social network member's identifying data has been established, processes that require strong identity verification may then use the resulting information. In particular, according to one embodiment, the various identifying data, along with each respecting accuracy index, may be published to inquiring users, thereby permitting them to decide if the data has a high enough reliability to be trusted. The social network member may retain control over which inquiring users may have access to his or her identifying data, either through personalized settings or by providing an individualized access password, as two non-limiting examples.

Accordingly, embodiments of the present invention may provide technique for creating, individualizing, and managing a repository of identifying data, from which the identity of participating social network members may be reliably verified by inquiring users, associations, or businesses. By allowing social network members to choose and specify their own identifying information, users of the system, method, and computer program product of the present invention are able to choose their own verified identifying facts, rather than relying on third-party databases. Having real-world acquaintances of the social network member confirm or deny the accuracy of identifying data ensures a higher level of fraud prevention. Embodiments of the present invention may further assist businesses in reliably confirming that an unknown customer is in fact a real person, thereby allowing greater potential for new business. In addition, embodiments of the present invention may enable members of online dating services to more readily connect with other members who may be confirmed as real people.

Overall System and Central Server:

Reference is now made to FIG. 1, which provides a block diagram of one type of system that may benefit from embodiments of the present invention. As shown, the system may include a Profile Sub-system 103 configured to enable a user to create, individualize and integrate identifying information, for example, in the manner described below with regard to FIGS. 3 through 7. According to one embodiment, the Profile Sub-system 103 may be in electronic communication with a Data Sub-system 104, to which the Profile Sub-system 110 may store identifying data, provided by the social network member or another authorized party, and contact information for acquaintances of the social network member, who are able confirm the accuracy of each piece of identifying data. The Data Sub-system 104 may in turn be in communication with a Verification Sub-system 105 configured to assign a numeric accuracy index to each piece of identifying data provided by the social network member. The Verification Sub-system 105, according to one embodiment, may comprise a Request Sub-system 106 and a Reception Sub-system 107, each of which may be in electronic communication with the Data Sub-system 104. A Publication Sub-system 109, which is configured to publish identifying data to appropriate parties, may be in electronic communication with the Data Sub-system 104.

According to one embodiment, the Profile Sub-system 103, Data Sub-system 104, Verification Sub-system 105, and Publication Sub-system 109 may each comprise a separate standalone device, such as a server or similar network entity or computing device, wherein the devices may be in communication with one another over the same or different wireless or wired network including, for example, a wired or wireless Personal Area Network (PAN), Local Area Network (LAN), Wide Area Network (WAN), and/or the like. Similarly, the Request Sub-system 106 and the Reception Sub-system 107 may also comprise separate standalone devices that are in communication with the other sub-systems 103 104 109. According to another embodiment, the Profile Sub-system 103, Data Sub-system 104, Verification Sub-system 105, and Publication Sub-system 109 may comprise separate modules or components of a Central Server 100, or similar network entity or computing device, which is discussed in more detail below with regard to FIG. 2.

The Profile Sub-system 103 may further be in communication with one or more user devices 102, the Verification Sub-system 105 (i.e., the Request Sub-system 106 and the Reception Sub-system 107, in combination) may further be in communication with one or more verifying user devices 108, and the Publication Sub-system 109 may further be in communication with one or more inquiring user devices 110, over the same or different wired or wireless communication network 101. According to one embodiment, the user devices 102 108 110, which may comprise a personal computer (PC), laptop, personal digital assistant (PDA), or other, similar electronic communication device, may be used (e.g., by a social network members) to generate a plurality of identifying data that, in combination, uniquely identify subject individuals. The same or different user devices 102 108 110 may further be used by a verifying acquaintance to interface with the Verification Sub-system 105 in order to supply the responses necessary to generate and/or update numeric accuracy indexes for each piece of respecting identifying data. In yet another embodiment, the same or different user devices 102 108 110 may further be used by an inquiring user (e.g., an interested dating website user, an adult-only website age verification system, an online auction bidder, etc.) to retrieve the accuracy indexes associated with a particular social network member's identifying data, wherein the supplied accuracy index may be used to determine whether the social network member has provided legitimate information in association with an online transaction.

Referring to FIG. 2, a schematic diagram of Central Server 100 according to one embodiment of the invention is shown. While the foregoing refers to a central "server", as one of ordinary skill in the art will recognize in light of this disclosure, any type of computing device operating in computer architectures other than a client-server architecture may likewise be configured to perform the functionality described herein. Embodiments of the present invention should, therefore not be limited to a server or to a client-server architecture. As may be understood from FIG. 2, in this embodiment, the Central Server 100 may include a processor 203 that communicates with other elements within the Central Server 100 via a system interface or bus 206. Also included in the Central Server 100 may be a display device/input device 204 for receiving and displaying data. This display device/input device 204 may be, for example, a keyboard or pointing device that is used in combination with a monitor. A network interface 205, for interfacing and communicating with other elements of a computer network (e.g., the user devices 102 108 110) may also be located within the Central Server 100.

The Central Server 100 may further include memory 202, which may include both read only memory (ROM) 207 and random access memory (RAM) 209. The server's ROM 207 may be used to store a basic input/output system (BIOS) 208, containing the basic routines that help to transfer information between elements within the Central Server 100. In addition, the Central Server 100 may include at least one storage device 201, such as a hard disk drive, a floppy disk drive, a CD-ROM drive, or optical disk drive, for storing information on various computer-readable media, such as a hard disk, a removable magnetic disk, or a CD-ROM disk. As will be appreciated by one of ordinary skill in the art, each of these storage devices 201 may be connected to the system bus 206 by an appropriate interface. The storage devices 201 and their associated computer-readable media may provide nonvolatile storage for a personal computer. It is important to note that any other type of computer-readable media known in the art could replace the computer-readable media described above. Such media may include, for example, magnetic cassettes, flash memory cards, digital video discs (DVDs), and Bernoulli cartridges.

A number of program modules including, for example, an operating system 210, may be stored by the various storage devices 201 and within RAM 209. As noted above with regard to FIG. 1, according to one embodiment, the Central Server 100 may comprise program modules or components corresponding to the Profile Sub-system 110, Data Sub-system 104, Verification Sub-system 105, and Publication Sub-system 109, respectively. Accordingly, the Central Server 100 may store an Profile Module 211, Data Module 212, Request Module 213, Reception Module 214, and Publication Module 215, wherein the Profile Module 211, Data Module 212, Request Module 213, Reception Module 214, and Publication Module 215 may each control certain aspects of the operation of the Central Server 100, with the assistance of the processor 203 and an operating system 210. While the foregoing describes the software embodiments of the invention in terms of modules by way of example, as one of ordinary skill in the art will recognize in light of this disclosure, the software associated with embodiments of the invention need not be modularized and, instead, may be intermingled or written in other non-modular formats.

For example, as discussed in more detail below with regard to FIG. 3, according to one embodiment of the present invention, the Profile Module 211 may, among other things, be configured to instruct the processor 203 to generate, and cause to be displayed, one or more user interface screens to receive appropriate identifying data from a social network user. The Profile Module 211 may further be configured to instruct the processor 203 to accept input that provides contact information for one or more persons who are acquainted with the social network user.

The Data Module 212 may, among other things, be configured to receive the identifying data provided by a social network member using the Profile Module 211 and to deposit this data into a repository that facilitates quick and easy retrieval. Similarly, the Data Module 212 may be configured to retrieve and deliver identifying data and acquaintance data for a particular social network member to the Request Module 213, which in turn may be configured to, among other things, instruct the processor 203 to generate, and cause to be sent, one or more verification requests to verifying acquaintances. The Reception Module 214 may be configured, among other things, to receive responses from those verifying acquaintances and provide updated numeric accuracy indexes for the subject identifying data to the Data Module 212, which in turn may be configured to update appropriate records in the data repository. The Publication Module 214 may, among other things, be configured to instruct the processor 203 to generate, and cause to be displayed, one or more user interface screens that provide various pieces of identifying data, along with their respective accuracy indexes, in response to an appropriate request from an inquiring user.

In FIG. 3, an electronic identification card 300, according to an embodiment of the present invention, is illustrated as a block diagram. An exemplary electronic identification card 300, which is suitable for publishing identifying data, may advantageously be provided by a hypertext document, as understood by those having skill in the art. Such a document may be configured to display the desired identifying data 301, along with an associated numeric accuracy index 302 for each item of identifying data 301. Items of identifying data 301, according to an embodiment of the present invention, may be presented in any form that is suitable for display using a common web browser application, for example, but not intended as a limitation, identifying data may be displayed as text with labels, images, maps, etc.

It would be apparent to those having skill in the art after having the benefit of this disclosure that numeric accuracy indexes 302, according to embodiments of the present invention, may be presented in a number of various fashions. Asocial network member may be permitted to select which type of numeric accuracy index would be displayed on an electronic identification card, according to at least one embodiment of the present invention. For example, but not intended as a limitation, a numeric accuracy index 302 may be displayed including only the number of positive indication received from verifying acquaintances. As another non-limiting example, numeric accuracy indexes 302 could comprise the number of total acquaintances polled for the associated item of identifying data 301.

Method of Creating, Individualizing and Integrating Repositories of Identifying Data:

Reference is now made to FIGS. 4-7, which illustrate the operations that may be taken, in order to create and individualize a repository of information that, when combined, uniquely identify a particular individual, and integrate access to that repository into any workflow requiring the identity of that individual to be reliably established, in accordance with embodiments of the present invention. According to embodiments of the present invention, the user interface and its functionality may be generally provided by the Central Server 100, or similar computing device, operating under the control of software stored in memory associated with the Central Server 100. In addition, the inputs described below as provided by the user interface may similarly be received, interpreted and processed by the Central Server 100, or similar computing device.

A non-limiting example of the steps in compiling a repository of verified identifying data is illustrated in FIG. 4 as a flowchart 400. As shown, the process may begin at the start (Block 401). From there, the user may input one or more pieces of identifying data in Bock 402. After inputting one or more pieces of identifying data in Block 402, an initial numeric accuracy index may be assigned to each item of identifying data in Block 403. After an initial numeric accuracy index has been assigned to each item of identifying data in Block 403, the user may identify one or more verifying acquaintances in Block 404.

In one embodiment of the present invention, the process of identifying one or more acquaintances in Block 404 advantageously comprises specifying account information for one or more social network websites in Block 404a. After account information has been specified for one or more social network websites in Block 404a, those social networks may be queried, in Block 404b, for a list of people in the user's "friend list", as understood by those having skill in the art. After the user's social networks have been queried for a list of people in the user's friend list in Block 404b, the user may specify, in Block 404c, which friends will act as verifying acquaintances for the identifying data that the user has input in Block 402. After the user has specified which friends will be verifying acquaintances in Block 404c, contact information for each verifying acquaintance may be retrieved in Block 404d.

After the user has identified one or more verifying acquaintances in Block 404, the verifying acquaintances may be queried, in Block 500, to determine the accuracy of the identifying data that the user input in Block 402. After the verifying acquaintances have been queried to determine the accuracy of the identifying data in Block 500, the method may be ended at Block 405.

Turning now to FIG. 5, a non-limiting example of the steps in verifying individual items of identifying data is illustrated as a flowchart 500. From the start (Block 501), a list of identifying data may be retrieved from a data repository in Block 502. As discussed above, embodiments of the present invention may permit a selection of which items of identifying data should be verified. As such, when a list of identifying data is retrieved in Block 502, that list may be limited to the items of identifying information that have been previously chosen to be verified. After retrieving a list of identifying data in Block 502, it can be determined, in Block 503, whether all of the items of identifying data have been processed. If it is determined in Block 503 that there are no items of identifying data that have not been processed, the method may wait for responses from verifying acquaintances at Block 507.

Otherwise, if it is determined in Block 503 that there are items of identifying data that have not been processed, a list of verifying acquaintances may be retrieved for the next item of identifying data from the data repository in Block 504. As discussed above, embodiments of the present invention may permit a selection of which acquaintances will serve as verifying acquaintances for one or more items of identifying data. As such, when a list of verifying acquaintances is retrieved in Block 504, that list may be limited to the acquaintances that the social network member has chosen to verify the currently processing item of identifying data.

Once a list of verifying acquaintances has been retrieved in Block 504, it can be determined, in Block 505, whether all of the verifying acquaintances have been processed. If it is determined in Block 505 that there are no verifying acquaintances that have not been processed, it can be determined again in Block 503 whether all of the items of identifying data have been processed. Otherwise, if it is determined in Block 505 that there are verifying acquaintances that have not been processed, a verification request for the currently processing item of identifying data to the next verifying acquaintance in Block 506. At some point, the method will finish sending verification requests for each of the items of identifying data, and it may begin retrieving responses from verifying acquaintances in Block 507. Once a response is received from a verifying acquaintance in Block 507, it can be determined, in Block 508, whether that response was positive or negative.

If it is determined in Block 508 that the verifying acquaintance has indicated that the item of identifying data in the verification request was accurate (i.e., a positive response was provided), the numeric accuracy index associated with that item of identifying data may be increased. In one embodiment, the amount by which the numeric accuracy index is increased may be varied based on, among other things, a numeric reliability index associated with the verifying acquaintance. A verifying acquaintance's numeric reliability index may be based on, among other things, whether the responses provided by that verifying acquaintance are consistent with responses received from other verifying acquaintances. As such, after adding to the numeric accuracy index for the item of identifying data associated with this verifying acquaintance's response in Block 509, or if it is determined in Block 508 that the verifying acquaintance has indicated that the item of identifying data in the verification request was inaccurate (i.e., a negative response was provided), that responding acquaintance's reliability index may optionally be adjusted in Block 510.

After the responding acquaintance's reliability index is optionally adjusted in Block 510, it can be determined, in Block 511, whether any more responses are available for processing. If it is determined in Block 511 that there are responses available to be processed, the next response may be retrieved in Block 507. If, however, it is determined in Block 511 that there are no responses waiting, the method can be ended at Block 512.

A non-limiting example of the steps in verifying a social network member's identity to an interested third party is illustrated in FIG. 6 as a flowchart 600. From the start (Block 601), a user may create a repository of verified identity data in Block 400. After the user has created a repository of identifying data in Block 400, the user may choose which items of identifying data should appear on an electronic identification card in Block 602. After the user has chosen which items of identifying data should appear on an electronic identification card in Block 602, the user may optionally chose, in Block 603, a display type for any numeric accuracy indexes that will appear on the electronic identification card. As discussed above with reference to FIG. 3, there may be many potential ways to present numeric accuracy indexes, according to embodiments of the present invention. For example, but not intended as a limitation, a numeric accuracy index may be displayed including only the number of positive indication received from verifying acquaintances. As another non-limiting example, numeric accuracy indexes could comprise the number of total acquaintances polled for the associated item of identifying data.

After the user has optionally chosen a display type for the numeric accuracy indexes that will appear on the electronic identification card in Bock 603, the user or receiver may optionally chose a password, in Block 604, that must be provided to access the electronic identification card. After a password is optionally chosen in Block 604, a uniform resource locator (URL) may be provided, in Block 605, which may be used to view the electronic identification card using a standard web browser. After a URL has been provided for accessing the electronic identification card in Block 605, the method may be ended at Block 606.

Finally, in FIG. 7, a non-limiting example of the steps in verifying a social network member's age to an adult-only website is illustrated as a flowchart 700. As shown, the process may begin at the start (Block 701). From there, the user may input his or her birth date in Block 702. After inputting a birth date in Block 702, an initial numeric accuracy index may be assigned, in Block 703, to the supplied birth date. After an initial numeric accuracy index has been assigned to the supplied birth date in Block 703, verifying acquaintances may be chosen at random in Block 704. After having the benefit of this disclosure, it would be apparent to those having skill in the art that randomly selecting acquaintances to be verifying acquaintance may drastically reduce the potential for fraud, wherein an underage user might only choose acquaintances who he or she knows will confirm an inaccurate birth date, perhaps in exchange for providing a reciprocal confirmation of inaccurate information. By randomly selecting verifying acquaintances, there may be a stronger likelihood that coworkers, family members, education professionals, or others, who are part of the user's real-world social network, will be queried to verify the user's age and who would be less inclined to respond fraudulently.

In one embodiment of the present invention, the process of randomly choosing verifying acquaintances in Block 704 advantageously comprises having the user specify account information for one or more social network websites in Block 704a. After the user specifies account information for one or more social network websites in Block 704a, those social networks may be queried, in Block 704b, for a list of people in the user's "friends list", as understood by those having skill in the art. After the user's social networks have been queried for a list of people in the user's friend list in Block 704b, a predefined number of verifying acquaintances may be selected at random in Block 704c. Once a predefined number of verifying acquaintances have been selected at random in Block 704c, contact information for each verifying acquaintance may be retrieved in Block 704d.

After verifying acquaintances have been chosen at random in Block 704, the verifying acquaintances may be queried, in Block 500, to determine the accuracy of the birth date that the user input in Block 702. After verifying acquaintances have been queried to determine the accuracy of the user's birth date in Block 500, positive or negative indications may be provided in response to requests made from age-restricted content publishers in Block 705. In one embodiment, a response mechanism may be provided as a remote procedure call, as understood by those having skill in the art. Such a remote procedure call may, for example, but not intended as a limitation, accept an incoming request comprising a plurality of parameters, wherein the parameterized request provides a definition of which scenarios should be responded to positively and which scenarios should be responded to negatively. As a non-limiting example, a parameterized request may include a threshold numeric value that should be compared with the numeric accuracy index for the associated item of identifying data. In such an embodiment, if the subject numeric accuracy index is not at least as high as the provided threshold numeric value, a negative indication may be returned in response to the request. Otherwise, if the subject numeric accuracy index is equal to the provided threshold numeric value, or even higher, a positive indication may be returned in response to the request. Those having skill in the art, after having the benefit of this disclosure, would recognize that such a configuration may provide an extremely flexible mechanism for automated verification of identifying data, such as age, marital status, occupational status, etc.

Once positive or negative indications have been provided in response to requests from age-restricted content publishers in Block 705, the method may be ended at Block 706. It would be apparent, after having the benefit of this disclosure, to those having skill in the art that one advantageous application of this method may be in the context of an internet search engine, wherein the search provider desires to filter search results based upon the age of the searching user. For example, but not intended as a limitation, Google's "Safe Search" option is provided to prevent pornographic and other adult material from appearing in search results when that option has been enabled by the searching user. This option may be advantageously controlled by making a parameterized request to an embodiment of the present invention, such that searching users being younger than some predefined threshold, i.e., eighteen years, may automatically have their search results filtered. As described above, the threshold value may be supplied by the search provider, as a parameter within the parameterized request, to allow for ease of configurability and improved flexibility.

Conclusion:

As described above and as will be appreciated by one skilled in the art, embodiments of the present invention may be configured as a systems, methods, and computer program products. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

Embodiments of the present invention have been described above with reference to block diagrams and flowchart illustrations of methods, systems and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus, such as a processor 203 discussed above with reference to FIG. 2, to produce a machine, such that the instructions, which execute on the computer or other programmable data processing apparatus, create a means for implementing the functions specified in the flowchart block or blocks.

These computer program instructions may also be stored in a computer-readable memory that can direct a computer or other programmable data processing apparatus (e.g., processor 203 of FIG. 2) to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support (1) combinations of means for performing the specified functions; (2) combinations of steps for performing the specified functions; and (3) program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Many modifications and other embodiments of the inventions set forth herein will come to the mind of one skilled in the art, to which these embodiments of the invention pertain, after having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated, as may be set forth in some of the appended claims. Although specific terms are employed herein, they are used in a generic and descriptive sense only and not for purposes of limitation.

That which is claimed is:

1. A system for verifying the identity of a social network member comprising:
    a user device; and
    a network entity in electronic communication with the user device, the network entity including a processor and a memory;
    a profile module stored on the memory;
    a data module stored on the memory;
    a verification module stored on the memory, the verification module comprising a request module and a reception module; and
    a publication module stored on the memory;
    wherein the profile module is executable by the processor and configured to, upon execution, receive:
        a plurality of identifying data as multiple items of identifying data relevant to the identity of the social network member; and
        contact information for a plurality of persons who have knowledge of the identity of the social network member, the plurality of persons who have knowledge of the identity of the social network member being defined as acquaintances, the contact information for acquaintances being defined as acquaintance data;
    wherein the data module is executable by the processor and configured to, upon execution, store and retrieve the plurality of identifying data and the acquaintance data;
    wherein the verification module is executable by the processor and configured to, upon execution, assign a numeric accuracy index to each of the plurality of identifying data;
    wherein the publication module is executable by the processor and configured to, upon execution, selectively publish:
        at least one of the items of identifying data, the at least one item of identifying data that is published being defined as at least one item of published data; and
        the respective numeric accuracy index associated with the at least one item of identifying data that is published as the at least one item of published data;
    wherein the request module is executable by the processor and configured to, upon execution, send at least one verification request for at least one respective item of identifying data to at least one of the acquaintances, the at least one acquaintance receiving the at least one verification request being defined as at least one verifying acquaintance; and
    wherein the reception module is executable by the processor and configured to, upon execution, receive at least one of a positive indication, a negative indication, and a without knowledge indication from the at least one verifying acquaintance, the positive indication indicating that the item of identifying data in the at least one verification request is accurate, the negative indication indicating that the item of identifying data in the at least one verification request is inaccurate, and the without knowledge indication indicating that the at least one verifying acquaintance is without knowledge of the item of identifying data in the at least one verification request;
    wherein the publication module publishes the at least one item of identifying data responsive to receipt of a request from an authorized user.

2. The system according to claim 1 wherein the profile module is further configured to, upon execution, receive at least one password used to control access to at least a portion of the published data.

3. The system according to claim 1 wherein the at least one verifying acquaintance is selected by the social network member.

4. The system according to claim 1 wherein the verification module is further configured to, upon execution, modify the numeric accuracy index for each of the plurality of identifying data to reflect the number of positive indications received from the at least one verifying acquaintance for each of the items of identifying data.

5. The system according to claim 1 wherein the verification module is further configured to, upon execution, modify the numeric accuracy index for each of the plurality of identifying data to reflect the number of negative indications received from the verifying acquaintances for each of the items of identifying data.

6. The system according to claim 1 wherein the verification module is further configured to, upon execution, assign a numeric reliability index to the at least one verifying acquaintance by comparing at least one of the positive indication, negative indication, and without knowledge indication provided by the at least one verifying acquaintance with the respective indications provided by another at least one verifying acquaintance.

7. The system according to claim 1 wherein the publication module comprises a trustmark module, wherein the trustmark module is executable by the processor and configured to, upon execution, display at least one graphical icon indicating a respective trust level regarding the identity of the social network member.

8. The system according to claim 1 wherein the publication module comprises a response module that is executable by the processor and configured to, upon execution, deliver at least one of a positive indication and a negative indication in response to a parameterized request for verification of at least one item of identifying data.

9. A computer-implemented method of verifying the identity of a social network member, the method comprising:
   receiving a plurality of identifying data as multiple items of identifying data relevant to the identity of the social network member;
   assigning a numeric accuracy index to each of the plurality of identifying data;
   receiving contact information for a plurality of persons who have knowledge of the identity of the social network member, the plurality of persons who have knowledge of the identity of the social network member being defined as acquaintances;
   sending at least one verification request for at least one respective item of identifying data to at least one of the acquaintances, the at least one acquaintances receiving the at least one verification request being defined as at least one verifying acquaintance;
   receiving at least one of a positive indication, a negative indication, and a without knowledge indication from the at least one verifying acquaintance, the positive indication indicating that the item of identifying data in the at least one verification request is accurate, the negative indication indicating that the item of identifying data in the at least one verification request is inaccurate, and the without knowledge indication indicating that the at least one verifying acquaintance is without knowledge of the item of identifying data in the at least one verification request; and
   selectively publishing, in response to receipt of a request from an authorized user, at least one of the items of identifying data, the at least one item of identifying data that is published being defined as at least one item of published data and the respective numeric accuracy index associated with the at least one item of published data.

10. The computer-implemented method according to claim 9 further comprising receiving at least one password used to control access to at least a portion of the published data.

11. The computer-implemented method according to claim 9 further comprising receiving a selection of the at least one verifying acquaintance from the social network member.

12. The computer-implemented method according to claim 9 further comprising modifying the numeric accuracy index for each of the plurality of identifying data to reflect the number of positive indications received from the at least one verifying acquaintance for each of the identifying data.

13. The computer-implemented method according to claim 9 further comprising modifying the numeric accuracy index for each of the plurality of identifying data to reflect the number of negative indications received from the at least one verifying acquaintance for each of the identifying data.

14. The computer-implemented method according to claim 9 further comprising assigning a numeric reliability index to the at least one verifying acquaintance by comparing at least one of the positive indication, negative indication, and without knowledge indication received from the at least one verifying acquaintance with the respective indications provided by another at least one verifying acquaintance.

15. The computer-implemented method according to claim 9 wherein selectively publishing the at least one item of published data and the respective numeric accuracy index associated with the at least one item of published data comprises displaying at least one graphical icon indicating a respective trust level regarding the identity of the social network member.

16. The computer-implemented method according to claim 9 wherein selectively publishing the at least one item of published data and the respective numeric accuracy index associated with the at least one item of published data comprises delivering at least one of a positive indication and a negative indication in response to a parameterized request for verification of at least one item of identifying data.

17. A computer program product for verifying the identity of a social network member, the computer program product comprising at least one non-transitory computer-readable storage medium having one or more computer-readable program code portions stored therein, the computer-readable program code portions comprising:
   a first executable portion for receiving a plurality of identifying data as multiple items of identifying data relevant to the identity of the social network member;
   a second executable portion for assigning a numeric accuracy index to each of the plurality of identifying data;
   a third executable portion for receiving contact information for a plurality of persons who have knowledge of the identity of the social network member, the plurality of persons who have knowledge of the identity of the social network member being defined as acquaintances;
   a fourth executable portion for sending at least one verification request for at least one respective item of identifying data to at least one of the acquaintances, the at least one acquaintance receiving the at least one verification request being defined as at least one verifying acquaintance;
   a fifth executable portion for receiving at least one of a positive indication, a negative indication, and a without knowledge indication from the at least one verifying acquaintance, the positive indication indicating that the item of identifying data in the at least one verification request is accurate, the negative indication indicating that the item of identifying data in the at least one verification request is inaccurate, and the without knowledge indication indicating that the at least one verifying acquaintance is without knowledge of the item of identifying data in the at least one verification request; and
   a sixth executable portion for selectively publishing, in response to receipt of a request from an authorized user, at least one of the items of identifying data, the at least one item of identifying data that is published being defined as at least one item of published data and the respective numeric accuracy index assigned to the at least one item of published data.

18. The computer program product according to claim 17, wherein the computer-readable program code portions further comprise a seventh executable portion for receiving at least one password used to control access to the at least one item of published data.

19. The computer program product according to claim 17, wherein the computer-readable program code portions further comprise a seventh executable portion for receiving a selection of the at least one verifying acquaintance from the social network member.

20. The computer program product according to claim 17, wherein the computer-readable program code portions further comprise a seventh executable portion for modifying the numeric accuracy index for each of the plurality of identifying data to reflect the number of positive indications received from the at least one verifying acquaintance for each of the identifying data.

21. The computer program product according to claim 17, wherein the computer-readable program code portions further comprise a seventh executable portion for modifying the numeric accuracy index for each of the plurality of identifying data to reflect the number of negative indications received from the at least one verifying acquaintance for each of the identifying data.

22. The computer program product according to claim 17, wherein the computer-readable program code portions further comprise a seventh executable portion for assigning a numeric reliability index to the at least one verifying acquaintance by comparing at least one of the positive indication, negative indication, and without knowledge indication received from the at least one verifying acquaintance with the respective indications provided by another at least one verifying acquaintance.

23. The computer program product according to claim 17, wherein the computer-readable program code portions further comprise a seventh executable portion for displaying at least one graphical icon indicating a respective trust level regarding the identity of the social network member.

24. The computer program product according to claim 17, wherein the computer-readable program code portions further comprise a seventh executable portion for delivering at least one of a positive indication and a negative indication in response to a parameterized request for verification of at least one item of identifying data.

\* \* \* \* \*